United States Patent [19]

Billström

[11] Patent Number: 5,729,537
[45] Date of Patent: Mar. 17, 1998

[54] METHOD AND APPARATUS FOR PROVIDING ANONYMOUS DATA TRANSFER IN A COMMUNICATION SYSTEM

[75] Inventor: Lars Axel Billström, Solna, Sweden

[73] Assignee: Telefonaktiebolaget L M Ericsson (publ), Stockholm, Sweden

[21] Appl. No.: 664,571

[22] Filed: Jun. 14, 1996

[51] Int. Cl.$^6$ .................................................. H04L 9/32
[52] U.S. Cl. ............... 370/329; 370/349; 340/825.34; 340/825.47; 379/62; 455/54.2; 380/23
[58] Field of Search ..................... 370/352, 353, 370/354, 355, 356, 377, 384, 329, 328, 341, 348, 322, 323, 338; 340/825, 825.5, 825.3, 825.31, 825.34, 825.44, 825.47; 379/59, 62, 56, 58; 455/39, 49.1, 53.1, 54.1, 56.1, 31.1, 54.2, 33.1; 380/23

[56] References Cited

U.S. PATENT DOCUMENTS

| | | | |
|---|---|---|---|
| 5,440,541 | 8/1995 | Iida et al. | 370/352 |
| 5,455,863 | 10/1995 | Brown et al. | 380/23 |
| 5,457,680 | 10/1995 | Kamm et al. | 370/332 |
| 5,519,706 | 5/1996 | Bantz et al. | 370/329 |
| 5,539,824 | 7/1996 | Bjorklund et al. | 380/21 |
| 5,555,551 | 9/1996 | Rudokas et al. | 379/59 |
| 5,557,654 | 9/1996 | Maenpaa | 379/58 |
| 5,596,641 | 1/1997 | Ohashi et al. | 380/23 |

*Primary Examiner*—Alpus H. Hsu
*Assistant Examiner*—Kwang Bin Yao
*Attorney, Agent, or Firm*—Jenkens & Gilchrist; Robert H. Kelly; Thomas L. Crisman

[57] ABSTRACT

A method, and associated apparatus, of providing a communication station with anonymous access to a communication network to communicate data therein. Access is provided to the communication station only after authenticating that the communication station is authorized to communicate in the network, but access is provided without individually identifying the communication station to the network with a permanent identifier unique to the communication station.

32 Claims, 2 Drawing Sheets

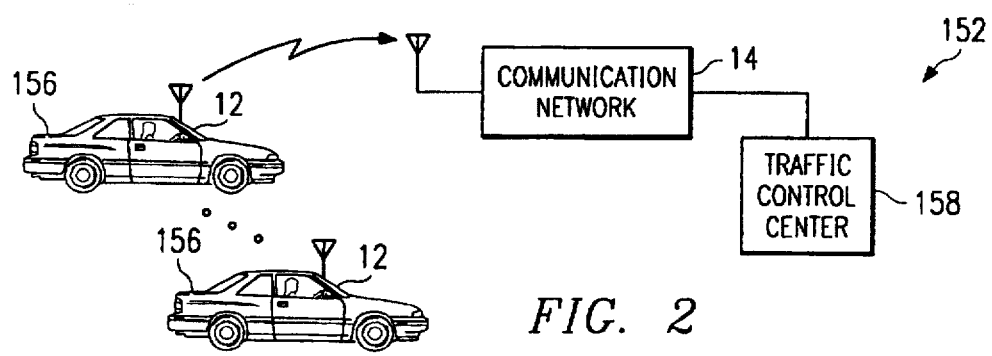
FIG. 2
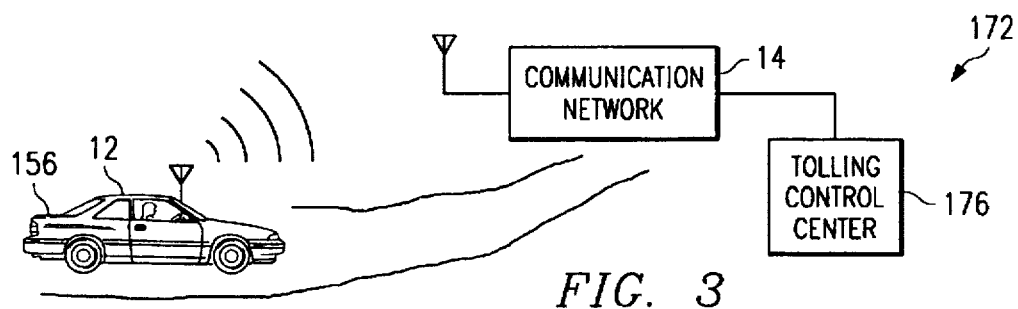
FIG. 3
FIG. 4
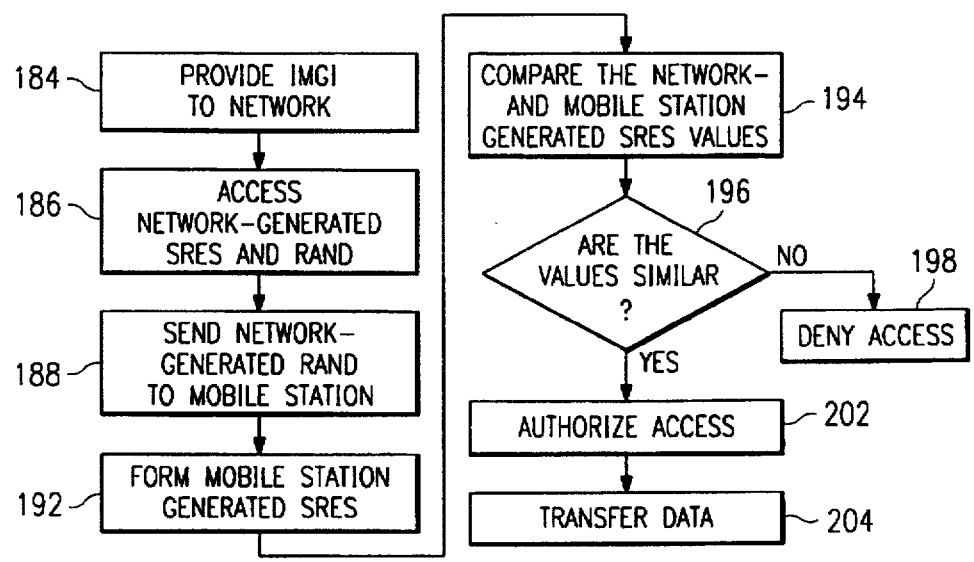

5,729,537

METHOD AND APPARATUS FOR PROVIDING ANONYMOUS DATA TRANSFER IN A COMMUNICATION SYSTEM

The present invention relates generally to the transmission of data, such as packet data transmitted in a communication system providing packet radio services or circuit-switched data transmitted in a communication system providing circuit-switched communications. More particularly, the present invention relates to a method, and associated apparatus for implementing the method, for providing a communication station with anonymous access to a communication network which forms a portion of the communication system. While anonymous access to the network is provided, such access is permitted only after authenticating that the communication station is authorized to communicate with the network. Once the anonymous access is provided, communication of data between the communication station and a correspondent entity is permitted, without identifying the communication station to the communication network by a permanent, unique identifier.

Because the communication station is provided anonymous access to the network, communication of data to or from the communication station is effectuated without necessitating that the communication station be uniquely identified with a permanent identifier unique to the communication station. The particular communication station and the user thereof remains anonymous. The present invention can be used, for example, to provide a mobile station with anonymous access to packet radio services, such as the General Packet Radio Service (GPRS) proposed to be standardized in the Global System for Mobile communication (GSM) telecommunications system standard. Authentication is performed to ensure that the mobile station is authorized to communicate with the network.

BACKGROUND OF THE INVENTION

Advancements in the fields of electronics and communications have permitted the introduction and commercialization of many new types of communication systems. Information can be affordable communicated to locations and in manners previously not possible or affordable.

The field of cellular telephony is exemplary of a communication system that has been made possible due to such advancements. Communication pursuant to a cellular telephone, or other radio telecommunication system, is advantageous as a fixed, wireline connection is not required between a sending station and a receiving station to permit communications to be effectuated therebetween. A cellular telephone, or other radio telecommunication system is therefore particularly advantageous to effectuate communications when the use of fixed or hard-wired connections to effectuate communications would be inconvenient or impractical. Some conventional communications pursuant to a cellular communication system are sometimes referred to as circuit-switched communications as data is transmitted upon channels and circuit paths dedicated during the communication to a particular sending and receiving station pair.

Continued advancements in the field of cellular telephony, as well as other types of radio telecommunications, have permitted the introductions of new services and new forms of communication pursuant to already-installed cellular, and other radio telecommunication, networks.

For instance, proposals have been set forth to provide existing cellular, and other communication networks, with the capability of communicating packet data, such as the aforementioned General Packet Radio Service (GPRS). Information which is to be transmitted between a sending and receiving station is formed into discrete packets of data. Individual ones of the packets can be sent on a communication channel from the sending station to the receiving station. As the information is communicated by way of discrete packets, the sending station utilizes the channel only during the time periods required to send the discrete packets. The channel is typically, therefore, a shared channel, used by a plurality of sending stations.

Because of the shared nature of such a shared channel, a packet of data to be transmitted by a sending station might have to be queued until the shared channel becomes available. However, because the shared channel is shared, the costs of transmitting data on a shared channel can be shared amongst many users as a dedicated communication channel need not be allocated to the sending station to effectuate communication of the packet. Communications effectuated via the Internet and communications pursuant to paging networks are also exemplary of communication systems which make use of data transmission of packet data.

The aforementioned, GSM digital cellular communication network is exemplary of a cellular communication system for which the introduction of GPRS has been proposed and proposed standards therefor have been promulgated. GSM mobile stations constructed corresponding to such standards are able to communicate packet data via the GSM network.

Authentication procedures are performed prior to providing a GSM mobile station with access to the GSM network to communicate therein. Standard authentication procedures are promulgated in the GSM standards. An exemplary authentication procedure is described, for instance, in U.S. Pat. No. 5,282,250, assigned to the assignee of the present invention. The contents thereof are hereby incorporated by reference herein.

Authentication procedures are performed to ensure that the mobile station is authorized to communicate in the system. Other cellular telephone, and other radio telecommunication systems utilize analogous authentication procedures for similar reasons.

As part of the authentication procedure in the GSM communication system, an international Mobile Subscriber identity (IMSI) which permanently and uniquely identifies the mobile station, or at least the party to whom communications provided pursuant to the network are to be billed, is provided to the network. Responsive to such provided identity, the authentication procedure authenticates that the mobile station is authorized to communicate via the network. By providing the IMSI to the network, the identity of the user necessarily is provided to the network.

Several proposals have been set forth of communication applications which utilize GPRS provided pursuant to the GSM network. Such applications might similarly be provided pursuant to other types of cellular, or other, communication systems. Such proposals can be implemented in a GSM mobile station which also permits conventional, circuit-switched (e.g., conventional voice-telephonic) communications or, in some proposed applications, in a mobile station which merely provides for packet data communication. Depending upon the communication system in which the mobile station is operable, the term mobile station is used to refer to a device which permits only circuit-switched communications, only GPRS communications, or at least both GPRS communications and circuit-switched communications.

Existing authentication procedures used prior to granting access of the mobile station to the communication network require that the IMSI, or other permanent, unique identifier, be provided to the network. Such a need to identify the terminal with its IMSI, or other permanent, unique identifier, would prohibit implementation of certain of such proposed applications. In several of such proposed applications, privacy rights of the users of the mobile stations would be adversely affected.

An exemplary application which has been proposed is a traffic telematic application in which vehicular-mounted, mobile stations send positional, directional, and speed information to a traffic control center. Responsive to such information conveyed to the traffic control center by a plurality of vehicular-mounted mobile stations, traffic control operations can be implemented to alleviate traffic congestion, when necessary.

Another exemplary application which has been proposed is an automatic tolling application in which passage of automotive vehicles through an automotive toll gate, or tolling point, are provided to a tolling control center. Vehicular-mounted mobile stations transmit signals to a tolling control center when passing through the automotive toll gate.

To permit such applications, as well as others, to be implemented without adversely affecting the privacy rights of users of the mobile stations, anonymous access by the mobile station to the network is required. But, there is still a need to authenticate the mobile station to prevent non-authorized use of the network.

What is needed, therefore, is a manner by which to provide a mobile station with anonymous access to a communication network of a communication system, thereby to permit the mobile station to communicate data in a communication system while also providing a manner by which to authenticate the mobile station prior to providing the mobile station with such anonymous access to the system.

It is in light of this background information related to the communication of data that the significant improvements of the present invention have evolved.

SUMMARY OF THE INVENTION

The present invention advantageously provides a method, and associated apparatus for implementing the method, of providing a communication station with anonymous access to a communication network of a communication system to communicate data in the communication system. Access is provided to the communication station only after authenticating that the communication station is authorized to communicate in the network, but access is provided without individually identifying the communication station to the network with a permanent identifier unique to the communication station.

In one aspect of the present invention, the communication station comprises a mobile station operable in a communication system which provides packet radio service, such as GPRS, permitting transfer of packet data between the mobile station and a correspondent entity. The mobile station is provided with anonymous access to the communication network. The mobile station is authenticated as being a member of a group of mobile stations permitted to utilize the communication network prior to granting the mobile station access to the network. Thereby, the mobile station is authenticated without requiring that a permanent, unique identifier of the mobile station be used to authenticate the mobile station.

The teachings of the present invention can be advantageously utilized to provide anonymous access to generalized packet radio services proposed as part of the GSM digital cellular communication system. Access of the mobile station to the GSM network, thereby to provide the mobile station with generalized packet radio services, is provided without requiring that the mobile station provide the network with the mobile station's International Mobile Subscriber Identity (IMSI). Instead, the mobile station provides the GSM network with an International Mobile Group identity (IMGI). The mobile station can thereby be authenticated as being a member of a group of anonymous mobile stations authorized to be provided with packet radio services. Services are provided, thereby, to the mobile station without requiring that the IMSI of the mobile station be provided to the network.

In another aspect of the invention, the mobile station is provided anonymous access to the communication network to permit the transfer of circuit-switched data therethrough.

In one embodiment, the mobile station permits packet radio services only to be provided. In another embodiment, the mobile station forms a portion of a mobile station which permits circuit-switched telecommunications, such as those provided in a conventional cellular communication system. And, in another embodiment, the mobile station permits both circuit-switched communications and packet data communications.

The use of an anonymous mobile station identity for GPRS anonymous access containing an operator specific group identity and a random number to provide a unique identity has been proposed in ETSI Tdoc SMG3 95G096. However, no solution for providing an anonymous access service is presented in the document.

In one exemplary implementation, the present invention is utilized to initiate packet data transmission in a traffic telematic application, for example, to provide a traffic control center with vehicular traffic information. In such an application, anonymity of communications is required for privacy reasons. Mobile stations are positioned upon vehicles and send packet data representative of, e.g., positional, directional, and speed information related to the position of the vehicles upon which the mobile stations are positioned. Responsive to such information, traffic control operations can be implemented, such as traffic light control operations to alleviate traffic congestion. Because of the anonymous access granted to the mobile station, the privacy of the user or owner of the vehicle in which the mobile station is positioned is maintained.

In another exemplary application, the present invention is utilized in an automatic tolling application. Vehicular-mounted mobile stations transmit signals when passing through an automotive toll gate. Indications of such signals are forwarded on to a tolling control center, such as by way of a GSM communication network. This permits toll fees to be paid electronically, e.g., based upon coding of a smart card. The mobile station is granted anonymous access to the network such that, to the network, the identity of the mobile station is anonymous. Indications of the mobile station's permanent identity may, optionally, depending upon the payment method, be provided to the tolling control center, but in a manner which is transparent to the communication network. Viz., the permanent identity of the mobile station remains unknown to the communication network.

Other traffic telematic applications, as well as other applications, can similarly embody the teachings of the present invention to provide a communication station anonymous access to a communication network while also authenticating the communication station to ensure that the communication station is authorized to communicate with the communication system.

The teachings of the present invention, therefore, can also be advantageously utilized in a communication system to provide anonymous access to permit the communication of the circuit-switched data.

In these and other aspects, therefore, a method, and associated apparatus, for initiating data transmission in a communication system is disclosed. A communication network effectuates communication between at least a first communication station and a correspondent entity. The first communication station is a group-identified communication station of a group of group-identified communication stations. Each group-identified communication station of the group is identified by a group identifier. The data transmission is initiated without individually identifying the first communication station with a permanent identifier unique to the first communication station. A group identifier signal is provided to the communication network. The group identifier signal is of a value representative of at least the group identifier. At least a first network coded signal and a second network-coded signal are formed responsive, at least in part, to the group identifier signal provided to the communication network. The second network-coded signal is then sent to the first communication station. A first station-coded signal is formed at the first communication station responsive to reception of the second network-coded signal. The first network-coded signal is then compared with the first station-coded signal. Then, authorization of initiation of transmission of the data between the first communication station and the communication network is authorized responsive to such comparisons.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 2 illustrates a partial functional block, partial schematic illustration of an exemplary application in which an embodiment of the present invention is utilized to provide vehicular traffic information to a control center.

FIG. 3 illustrates a partial functional block, partial schematic illustration of another exemplary application in which an embodiment of the present invention is utilized to automatically toll the passage of vehicular traffic at a vehicular toll gate.

FIG. 4 illustrates a flow diagram listing the method steps of an embodiment of the present invention.

DETAILED DESCRIPTION

Figure 1:
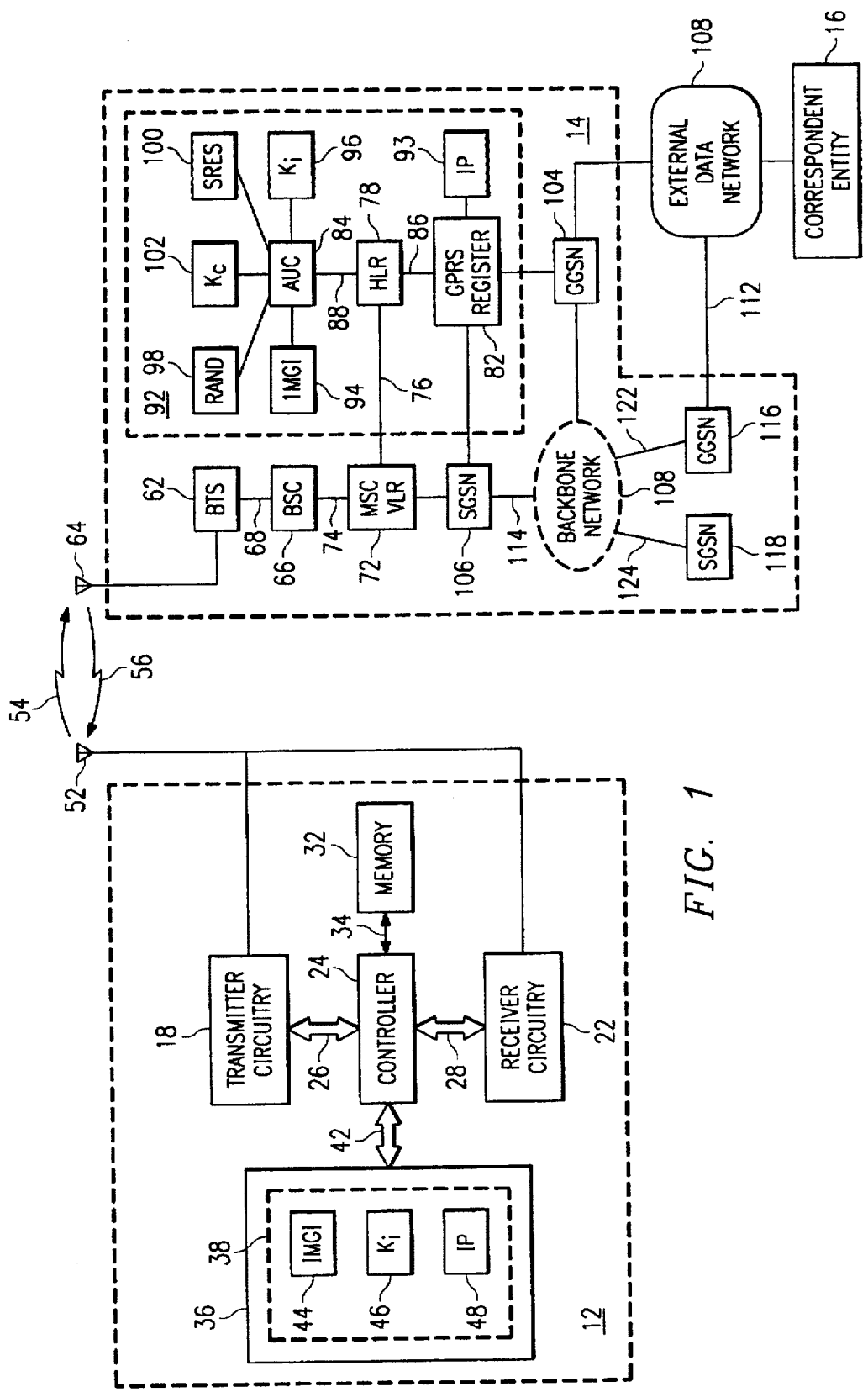
FIG. 1 illustrates a functional block diagram of an exemplary communication system in which an embodiment of the present invention is operable to form a portion thereof.

Referring first to FIG. 1, an exemplary communication system, shown generally at 10, provides anonymous access of a mobile station 12 to a communication network 14. The communication system 10 here forms a GSM communication system, the mobile station 12 forms a GSM mobile station, and the communication network includes a GSM infrastructure network.

The anonymous access provided to the mobile station 12 during operation of an embodiment of the present invention permits the mobile station 12 to communicate by way of the communication network 14 with a remotely-positioned device, here a correspondent entity 16, without identifying the mobile station 12 with a permanent identifier which uniquely identifies the mobile station. While, for purposes of illustration, a single mobile station 12 is illustrated, a plurality of mobile stations are able to communicate by way of the communication network 14. The mobile station 12 is one of a group of mobile stations, each mobile station of the group commonly-identified with a group identifier.

In one embodiment of the present invention, the mobile station 12 permits the communication of packet data. In another embodiment of the present invention, the mobile station 12 permits the communication of circuit-switched data. And in another embodiment of the present invention, the mobile station 12 permits the communication of at least both packet data and circuit-switched data. In the exemplary embodiment illustrated in the Figure, the mobile station 12 is operable to communicate packet data by way of the communication network 14, here forming a GPRS communication network.

The mobile station 12 includes, inter alia, both transmitter circuitry 18 and receiver circuitry 22. Operation of the transmitter and receiver circuitry 18 and 22 is controlled by processing circuitry, here identified as a controller 24. The controller 24 is coupled to the transmitter and receiver circuitry 18 and 22 by way of lines 26 and 28, respectively. The controller is further coupled to a memory device 32 by way of lines 34. In the exemplary embodiment in which the communication system 10 comprises a GSM communication system, the transmitter and receiver circuitry are respectively operable to transmit and to receive TDMA, GMSK-modulated signals. In other embodiments, of course, the circuitry of the mobile station 12 is operable to generate and to receive other types of communication signals, modulated in other manners and in other communication schemes.

A Subscriber Identity Module (SIM) card 36 is positioned at the mobile station 12 and includes a memory element 38. The SIM card 36 is coupled to the circuitry of the mobile station 12 in conventional manner, here indicated by the lines 42 connecting the SIM card 36 with the controller 24.

The memory element 38 includes storage locations for storing an International Mobile Group Identity (IMGI) 44, an authentication key ($K_i$) 46, and, optionally, one or more destination address. Here, a single Internet protocol address (IP) 48 is illustrated. In one embodiment, the memory element 38 of the SIM card 36 may further include additional storage locations for storing other information, such as an International Mobile Subscriber Identity (IMSI), and an associated authentication key, $K_i$, conventionally utilized e.g., in an authentication procedure pursuant to conventional telecommunication by way of the mobile station 12. Uplink signals generated during operation of the mobile station 12 are formed by the transmitter circuitry 18 and transduced by an antenna 52. Signals transmitted to the mobile station 12 are detected by the antenna 52, transduced thereat and applied to the receiver circuitry 22, all in conventional manner.

The communication network 14 receives uplink signals 54 generated by the mobile station 12 and transmits downlink signals 56 to the mobile station 12. The communication network 14 includes, inter alia, a base station (BTS) 62, operable in conventional manner to transceive the uplink and downlink signals 54 and 56 by way of an antenna transducer 64. The base station transceiver 62 is coupled to a base station controller (BSC) 66 by way of lines 68 in conventional manner and, the base station controller 66 is coupled, in turn, to a mobile services switching center (MSC) 72 by way of lines 74. A visitor location register (VLR) is positioned at the mobile services switching center, together referenced as an MSC/VLR. The mobile switching center 72 and the VLR located thereat, is coupled, in conventional fashion, here indicated by lines 76 to a home location register (HLR) 78.

The HLR 78 is coupled to a general packet radio service (GPRS) register 82 and to an authentication center (AUC) 84 by way of lines of 86 and 88, respectively. In one embodiment of the present invention, the GPRS register 82 and the AUC 84 are located together with the HLR 78; such an embodiment is indicated by the block 92, shown in dash. A storage location 93 coupled to the GPRS register 82 stores a value of an IP address analogous to the IP address 48.

The authentication center 84 includes storage locations for storing group identities, including the International Mobile Group Identity (IMGI) 94 and authentication key ($K_i$) 96, corresponding to the IMGI and $K_i$ 44 and 46 stored at the SIM card 36 at the mobile station 12. Processing circuitry of the AUC 84 generate a random number, RAND 98. The value of the RAND 98 is stored at a storage location of the communication network. In a GPRS context, the RAND 98 is stored in a GPRS register, or elsewhere, as appropriate. Processing circuitry of the AUC 84 is operable to execute an algorithm responsive to values of the RAND 98 and $K_i$ 96 to form a signed response (SRES) value, indicated by SRES 100. A ciphering key ($K_c$) 102 is also calculated by an algorithm, responsive to values of the RAND 98 and the $K_i$ 96.

The communication network is further shown to include a Gateway GPRS Support Node (GGSN) 104 and Serving GPRS Support Node (SGSN) 106. The GGSN 104 and SGSN 106 are logical entities. The GGSN 104 provides an interface towards external data networks, here an external data network 108. The GGSN 104 is operable, for example, to translate data formats, signaling protocols and address information in order to permit communication between different networks. The GGSN 104 is further operable for purposes of routing to SGSNs, such as the SGSN 106, to perform protocol conversions, and interrogations of data from the GPRS register 82.

The SGSN 106 provides, for example, for packet routing of packet data to and from a service area of the node 106, signaling exchanges with the MSC/VLR 72, and GPRS register 82, and control, monitoring, and parameter storage functions related to packet data mobile stations, such as the mobile station 12. As illustrated in the Figure, the service nodes 104 and 106 are coupled together by way of a backbone network 108, such coupling indicated by lines 112 and 114 extending to the backbone network 108. Additional support nodes, such as a GGSN 116 and a SGSN 118 are further illustrated to be coupled to the backbone network 108, such couplings indicated by the lines 122 and 124, respectively. Additional service nodes can additionally be represented and analogously coupled together, also to form portions of the communication network 14.

Exemplary operation of an embodiment of the present invention shall be described with respect primarily to the anonymous transfer of packet data, such as that described with respect to the GPRS Stage 1 Service Description, GSM 02.60, b1.3.0, Section 5.4.4. Such description defines a requirement for an anonymous access (AA) service, permitting anonymous mobile-originated (MO) packet transfer to a predetermined destination address. It should be understood, of course, that appropriate modifications can be made to the following description of operation for the communication of circuit-switched data rather than packet data and for the communication of data in other communication systems.

Although access of the mobile station 12 to permit the communication of data anonymously and transparently between the mobile station 12 and a correspondent entity 16, the mobile station 12 must be authenticated to ensure that the mobile station 12 should be permitted such access to communicate byway of the communication network 14. Operation of the present invention, while permitting anonymous access of the mobile station to communicate by way of the communication network 14, ensures that the mobile station is authorized to communicate therein. In an embodiment of the present invention, two-way communication between the mobile station 12 and the correspondent entity 16 is further permitted, all while preserving the anonymity of the mobile station in the communication network 14.

Acknowledged logical link operation is employed in order to provide reliable transmission across an air interface in a manner analogous to operation utilized in conventional GPRS point-to-point transmissions. And, in the exemplary embodiment, the GPRS service is assumed to be based upon an Internet protocol (IP) forming the network layer protocol. Other protocols, such as a conventional CLNP or X.25 protocol, can be supported in other embodiments. Such assumptions are made merely for describing the exemplary embodiment of FIG. 1. In other embodiments, other types of operation and other types of protocols can instead be utilized.

When data is to be communicated between the mobile station 12 and the correspondent entity 16, an attach/activation procedure, i.e., a log-on procedure, is implemented.

The mobile station 12 must identify itself to the communication network 14. To do so, the mobile station 12 transmits a group identifier signal to the network. The group identifier signal is of a value representative of the IMGI 44. In one embodiment, the group identifier signal further includes the destination address 48. To uniquely identify the mobile station 12 for purposes of immediate communication over a shared packet data channel, a random identifier, here a random temporary logical link identity (TLLI) also forms a portion of the group identifier signal. The random TLLI is, for instance, stored in a storage location of the memory element 32 or is generated in some manner by the controller 24. Transmission of the random TLLI permits, for a particular communication, the mobile station 12 to be individually identified until the mobile station is assigned a TLLI by SGSN, but the random TLLI does not provide the communication network 14 with the permanent identity of the mobile station 12.

A random TLLI is not necessary if the attach/activation procedure uses a conventional, dedicated GSM signaling channel.

The use of random TLLIs for IMSI-based mobile stations during the initial part of GPRS attach and routing area updating over a shared packet data channel has been proposed in ETSI GPRS SMG2/3 ad hoc Tdoc 95G087 and Tdoc 132/96. The documents also discuss handling of the inherent risk of random TLLI collision.

First, by allocating a sufficiently large number of bits for a random TLLI (22 bits for the random part proposed in said documents, but more bits may be allocated if required), the probability of two or more mobile stations in the same SGSN area choosing the same random TLLI during the very short period of time a random TLLI is used (a few seconds) can be made extremely low.

In the rare event of a random TLLI collision, the collision resolution rules suggested in Tdoc 132/96 may be used. These rules are based on aborting and restarting a signaling message sequence with a new random TLLI if a received message does not correspond with the expected message at a given point in a message sequence or in a given context.

However, in the anonymous access case, the means for context-based collision resolution is more limited as no IMSI-related information, unique for each mobile station, can be used. In one embodiment of the invention an International Mobile Station Equipment Identity (IMEI) is provided by the mobile station in ciphered form (in a later stage of the attach procedure when a ciphering key has been established) as a means for context-based collision resolution. In yet another embodiment of the invention, the following complementary method is employed. The SGSN monitors the random TLLIs received and currently in use at the SGSN (during the short initial part of anonymous attach procedures currently in progress). If a random TLLI is received which is already currently in use, the SGSN responds with an abort message to the cell from which the random TLLI was received. This causes the mobile stations receiving the abort message to make a new attempt with a new random TLLI.

Indications of the group identifier signal received at the base station 62 are forwarded, in conventional manner, to the SGSN 106 (or appropriate MSC/VLR 72).

A triplet is fetched by the SGSN 106 (or appropriate MSC/VLR 72). The triplets are values of the RAND 98, the ciphering key $K_c$ 102, and the SRES 100. The value of the RAND 98 is allocated in a manner to be unique within the group of mobile stations identified by the IMGI 94. And, the SRES 100 is, as mentioned previously, calculated responsive to values of the RAND 98 and the $K_i$ 96.

Once fetched, the SGSN 106 causes the retrieved value of the RAND 98 to be transmitted to the mobile station 12 by way of the base station 62 as part of a network-coded signal. The network-coded signal is generated through operation of the various elements of the network 14. The controller 24 also calculates the value of the SRES and also a value of an encryption key, $K_c$, with algorithms in the same manner as the manners by which the SRES 100 and $K_c$ 102 are calculated. Here, though, the values calculated at the mobile station 12 are calculated responsive to the value of the RAND 98 transmitted to the mobile station and to the value of $K_i$ 46 stored at the memory element 38.

Once the value of the SRES is calculated at the mobile station, a mobile station-coded signal indicative of the SRES is generated and transmitted back to the communication network 14. Indications of such signal are provided to the SGSN 106, and a comparison is made with the SRES 100, previously calculated at the AUC 84 and stored and fetched as part of the triplet, described above.

If the mobile station-calculated value of the SRES corresponds with the value of the SRES 100, the mobile station 12 is authenticated and is provided access to the communication network 14. Thereafter, additional communications between the mobile station and the communication network are ciphered, as required, using the ciphering keys calculated at the mobile station 12 and the fetched value of the ciphering key 102 fetched from the authentication center.

Under protection of ciphering with $K_c$, the SGSN allocates to the MS (from dynamic pools) an individual TLLI and an individual temporary IP address, or more generally, a temporary network layer identity.

In addition, a temporary IMSI may be allocated in order to facilitate similar handling in the network as for an individual IMSI subscriber.

SGSN and GGSN contexts are established and maintained for mobile stations, including the mobile station 12, in manners similar to those conventionally established and maintained in a GPRS system for an individual IMSI-based subscriber. In the exemplary embodiment illustrated in FIG. 1, the SGSN context includes, inter alia, subscriber data, including the IMGI, optional predefined IP addresses of destinations, a temporary IP address, a TLLI, a $K_c$, a mobile station state and cell/routing area location. The SGSN and GGSN contexts permit the mobile station 12 to be positioned at any location within the area encompassed by the communication network to communicate data therethrough.

Thereafter, communication of data between the mobile station 12 and a correspondent entity 16 by way of the communication network 14 can be performed. When packet data to be transmitted pursuant to GPRS provided by the communication network 14 is generated at the mobile station 12, transmission by way of the communication network 14 to the correspondent entity 16 is permitted, pursuant to a selected packet data protocol in conventional fashion. The allocation of a temporary network layer identity and the establishment and maintaining of SGSN and GGSN routing contexts permit two-way communication between the mobile station 12 and the correspondent entity 16. In the case of the IP protocol, this includes reliable transmission control protocol (TCP) communication. Reliable two-way communication should be especially useful for road toll and other applications involving electronic payments.

If the IMGI group subscription includes one or more predefined destination address (IP address 48 and 93 in FIG. 1), data transfers initiated by the mobile station 12 are screened with respect to the predefined destination address, either in the mobile station (IP address 48) or in the network (IP address 93).

The access provided to the mobile station 12 does not require identification of the mobile station with a permanent identifier unique to the mobile station. Instead, anonymous access is provided to the mobile station 12 responsive to the IMGI 44 which merely identifies the mobile station 12 as a member of a group of mobile stations. To the communication network, the actual, or permanent, identity of the mobile station 12 is not known. Depending upon the particular application, data provided by the mobile station 12 to the correspondent entity 16 may uniquely identify the mobile station 12 to the correspondent entity 16. Such an identification is, however, pursuant to an end-to-end application layer which is transparent to the communication network. Ciphering of data between the mobile station and the correspondent entity can also be performed on such an end-to-end application layer for security purposes.

Movement of the mobile station 12 anywhere throughout an area encompassed by the communication network 14 is permitted in manners analogous to those otherwise permitted in a GPRS communication network and the components of the communication network 14 are operable in similar such analogous manners responsive to such movement. Analogously, intra- and inter-SGSN cell/routing area updating procedures are analogous to corresponding procedures utilized for updating of a conventional IMSI-based GPRS, point-to-point service subscriber.

In the above-described procedure, once the mobile station 12 is provided access to communicate by way of the communication network 14, communication of data can be initiated either by the mobile station 12 or the correspondent entity 16. If, however, communication of data, in the form of a packet exchange sequence between the mobile station and a correspondent entity, is always initiated by the mobile station, mobility management required of the communication network can be simplified. For instance, when a packet exchange sequence is terminated and the mobile station 12 returns to a stand-by state, e.g., when an active state timer expires, the mobile station 12 may be regarded as not accessible for mobile-terminated (MT) traffic. A subsequent MT packet is thereafter rejected by the SGSN. There is then no need for routing area updating or for paging while the mobile station is in the stand-by state. Before subsequently initiating a new packet exchange sequence, the mobile station 12 must first perform a routing area update. In the event of an inter-SGSN routing area update, normal procedures for reestablishment of SGSN and GGSN contexts are then performed. Such a simplified mobility management process can either be an inherent part of an anonymous access service, or, instead, be a subscription option.

As described in the above procedures, security is provided, both in the authentication requirement requiring that the mobile station 12 be authenticated as a member of a group which is authorized to communicate by way of the communication network and also in the ciphering of data communicated between the mobile station and the communication network. In the authentication procedure, as described above, a single authentication key, $K_i$, common to the group of mobile stations 12 belonging to the group identified by the IMGI 44 and 94 is utilized. Also, an individual RAND 98 value and a ciphering key, $K_c$, for each mobile station 12 in the group is further utilized. The value of the RAND 98 and the $K_c$ associated therewith may be renewed, for example, in connection with routing area updating. Such a procedure provides the same level of protection utilized in a conventional GPRS communication system against a third party lacking a knowledge of the value of the authentication key, $K_i$. Additional secured protection between, for example, individual members of the same IMGI group of mobile stations can be provided by providing additional end-to-end ciphering between the mobile station 12 and the correspondent entity 16 on an application level.

The present invention can alternatively employ other ciphering methods such as the one used in the Cellular Digital Packet Data system, described in the CDPD System Specification, Release 1.1. In one embodiment, after SRES is received by the network, i.e., after authentication, instead of using a ciphering key $K_c$ based on RAND and $K_i$, one or more ciphering keys are exchanged between the network and the mobile station. In another embodiment, ciphering keys are exchanged between the network and the mobile station as a first part of an anonymous attach procedure. Again, once the ciphering keys have been exchanged, subsequent exchanges between the mobile station and the network are in ciphered form, ciphered, as required, by the ciphering keys. In the latter embodiment, this means that the authentication procedure, including transmission of IMGI and RAND, can then be performed in ciphered mode.

These two alternative ciphering embodiments may provide enhanced security between different mobile stations belonging to the same IMGI group.

FIG. 2 illustrates a traffic telematic system, shown generally at 152. An embodiment of the present invention is utilized to communicate data generated at vehicular-mounted mobile stations 12 mounted in vehicles 156 to a traffic control center 158 by way of a communication network 14. The data provided by the mobile stations 12 includes, for example, positional, directional, and speed information related to the vehicles 156 at which the mobile stations are positioned. Responsive to such information, the traffic control center implements traffic control operations. For instance, the traffic control center 158 can be caused to selectively alter the sequencing and functioning of traffic lights along a roadway, thereby to alleviate traffic congestion. Because of the anonymous access granted to the mobile stations 12, and, hence, the users or owners of the vehicles in which the mobile stations are positioned, the privacy of the users or owners of the vehicles is assured.

FIG. 3 illustrates another traffic telematics application, here shown generally at 172. Again, vehicular-mounted mobile stations 12 are mounted in vehicles 156 (one such vehicular-mounted mobile station 12 and one such vehicle 156 is illustrated in the Figure). As the vehicle 156 at which the mobile station 12 is mounted passes through a tolling point, signals generated by the mobile station 12 are detected by the communication network 14. Indications of such reception are provided to a tolling control center 176. The informational content of the signals generated by the mobile station 12 permits toll fees to be paid electronically, e.g., based upon coding of a smart card. Indications of the mobile station's permanent identity may, optionally, depending upon the payment method, be provided to the tolling control center on an end-to-end application layer transparent to the communication network. The anonymity of the mobile station to the communication network is thereby preserved while, utilizing the previously described process, the mobile station 12 is authenticated by way of a group identifier, such as the aforementioned IMGI.

FIG. 4 illustrates a method, shown generally at 182, of an embodiment of the present invention. The method initiates data transmission in a communication system having a communication network for effectuating communication between at least a first communication station, such as the mobile station 12, and a correspondent entity, such as the correspondent entity 16 (shown in FIG. 1). The first communication station is a group-identified communication station. Each group-identified communication station of the group is identified by a group identifier. The following method steps shall be described with respect to the exemplary embodiment shown in FIG. 1. Analogous embodiments may similarly be described and illustrated.

First, and as indicated by the block 184, the IMGI 44 is provided to the communication network 14. Then, as indicated by the block 186, network-generated SRES 100 and RAND 98 values are accessed. Such values are formed, in the embodiment of FIG. 1, responsive to values of the IMGI 94 and the $K_i$ 102 and can be pre-calculated pre-stored in one embodiment of the present invention.

Thereafter, and as indicated by the block 188, the network-generated RAND is sent to the mobile station 12. Responsive to reception of the RAND 98 at the mobile station, a mobile station-generated SRES value is formed. The network- and mobile station-generated SRES values are compared, as indicated by the block 194. Then, as indicated by the decision block 196, a determination is made as to whether the values are substantially similar. If not, access to the communication network is denied, as indicated by the block 198. If the values are substantially similar, the yes branch is taken from the decision block 196 to the block 202 and access of mobile station to communicate by way of the communication network 14 is provided. Thereafter, and as indicated by the block 204, data is transferred, as appropriate.

In another embodiment of the invention, anonymous access to conventional circuit-switched GSM (or similar cellular system) data services are provided, analogously with the above outlined principles for anonymous access to GPRS. The service provided is an anonymous mobile originated (MO) data call service. In this embodiment, a group identified mobile station would be allocated a Temporary Mobile Station Identity (TMSI) in a conventional manner, instead of a TLLI in the GPRS case. Authentication at call set-up would be based on the group subscriber authentication key. As only MO calls are supported, the mobility management procedures may be simplified compared to those conventionally used for IMSI-based mobile stations. Thus, a mobile station only needs to perform location updating periodically and, as required, before initiating a data call.

Operation of an embodiment of the present invention provides a communication station, such as the mobile station 12, with anonymous access to a communication network, such as the communication network 14, to communicate data therein. Access is provided to a communication station only after authenticating that the communication is authorized to communicate in the network, but access is provided without individually identifying the communication station to the network with a permanent identifier unique to the communication station.

The previous descriptions are of preferred examples for implementing the invention, and the scope of the invention should not necessarily be limited by this description. The scope of the present invention is defined by the following claims.

What is claimed is:

1. A method for providing anonymous data transfer service to at least one group of mobile stations in a mobile telecommunication system to permit anonymous transfer of data between a mobile station of the at least one group of mobile stations and a correspondent entity by way of a telecommunication network in which said anonymous transfer the telecommunication network is required to authenticate the mobile station's membership in the group but inhibited from learning the specific personal identity of the authenticated mobile station transferring the data, said method comprising the steps of:

forming the at least one group of mobile stations, the at least one group defined by a group identity and an associated group subscriber authentication key in which the group identity and group authentication key are to be shared in common by every mobile station in the group;

providing a copy of the group identity and the authentication key to each and every mobile station of the at least one group;

initiating an attach procedure, the attach procedure including an attach request sent by a mobile station of the group to the telecommunication network, the attach request including the group identity provided to each mobile station of the at least one group during said step of providing and not including any indicia of identity from which the telecommunication network can ascertain the specific personal identity of the mobile station sending the attach request;

allocating to the requesting mobile station a network-generated random number responsive to the attach request;

calculating at the mobile station a mobile station-generated signed response of a value, at least in part, responsive to the common group authentication key provided to the requesting mobile station and the network generated random number;

sending the mobile station-generated signed response to the telecommunication network;

calculating at the telecommunication network a network-generated signed response calculated, also at least in part, responsive to the common group authentication key and the network-generated random number;

comparing the mobile station-generated signed response with the network-generated signed response;

allocating to the mobile station,in response to said compared signed responses being identical, an individual temporary mobile station identifier from which the telecommunication network cannot ascertain the specific personal identity of the mobile station;

transferring the data between the mobile station through the network and the correspondent entity; and performing location management procedures.

2. A method for providing anonymous data transfer service to at least one group of mobile stations in a mobile telecommunication system to permit anonymous transfer of data between a mobile station of the at least one group of mobile stations and a correspondent entity by way of a telecommunication network, said method comprising the steps of:

forming the at least one group of mobile stations, the at least one group defined by a group identity and an associated group subscriber authentication key, said group identity being associated with at least one authorized destination address to which the data is to be transferred from mobile stations belonging to the group;

providing a copy of the group identity and the authentication key to each mobile station of the at least one group;

initiating an attach procedure, the attach procedure including an attach request sent by a mobile station of the group to the telecommunication network, the attach request including the group identity provided to each mobile station of the at least one group during said step of providing;

allocating to the mobile station a network-generated random number responsive to the attach request;

calculating at the mobile station a mobile station-generated signed response of a value, at least in part, responsive to the authentication key and the network-generated random number;

sending the mobile station-generated signed response to the telecommunication network;

calculating at the telecommunication network a network-generated signed response calculated, also at least in part, responsive to the authentication key and the network-generated random number;

comparing the mobile station-generated signed response with the network-generated signed response;

allocating the mobile station with an individual temporary mobile station identifier if comparisons performed during said step of comparing are of selected values;

transferring the data from the mobile station wherein said step of transferring the data comprises transferring to the at least one authorized destination address, through the network and the correspondent entity; and performing location management procedures.

3. A method for providing anonymous data transfer service to at least one group of mobile stations in a mobile telecommunication system to permit anonymous transfer of packet data between a mobile station of the at least one group of mobile stations and a correspondent entity by way of a telecommunication network, said method comprising the steps of:

forming the at least one group of mobile stations, the at least one group defined by a group identity and an associated group subscriber authentication key;

providing a copy of the group identity and the authentication key to each mobile station of the at least one group;

initiating an attach procedure comprising choosing at the mobile station a random temporary logical link identity to temporarily, uniquely identify the mobile station across a shared data packet channel in a signaling exchange with the telecommunication network, until the mobile station is allocated a network-generated temporary logical link identity by the network; the attach procedure also including an attach request sent by a mobile station of the group to the telecommunication network, the attach request including the group identity provided to each mobile station of the at least one group during said step of providing, and wherein the network identifies the mobile station across the shared packet data channel with the random temporary logical link identity until a network-generated temporary logical link is generated;

allocating to the mobile station a network-generated random number responsive to the attach request;

calculating at the mobile station a mobile station-generated signed response of a value, at least in part, responsive to the authentication key and the network-generated random number;

sending the mobile station-generated signed response to the telecommunication network;

calculating at the telecommunication network a network-generated signed response calculated, also at least in part, responsive to the authentication key and the network-generated random number;

comparing the mobile station-generated signed response with the network-generated signed response;

allocating the mobile station with an individual temporary mobile station identifier comprising a temporary logical link identity if comparisons performed during said step of comparing are of selected values;

transferring the data between the mobile station, through the network and the correspondent entity; and performing location management procedures.

4. A method for providing anonymous data transfer service to at least one group of mobile stations in a mobile telecommunication system to permit anonymous transfer of data between a mobile station of the at least one group of mobile stations and a correspondent entity by way of a telecommunication network, said method comprising the steps of:

forming the at least one group of mobile stations, the at least one group defined by a group identity and an associated group subscriber authentication key;

providing a copy of the group identity and the authentication key to each mobile station of the at least one group;

initiating an attach procedure, the attach procedure including an attach request sent by a mobile station of the group to the telecommunication network, the attach request including the group identity provided to each mobile station of the at least one group during said step of providing;

allocating to the mobile station a network-generated random number responsive to the attach request;

calculating at the mobile station a mobile station-generated signed response of a value, at least in part, responsive to the authentication key and the network-generated random number;

calculating a ciphering key from the authentication key and the network-generated random number at both the mobile station and the network;

storing the ciphering key;

sending the mobile station-generated signed response to the telecommunication network;

calculating at the telecommunication network a network-generated signed response calculated, also at least in part, responsive to the authentication key and the network-generated random number;

comparing the mobile station-generated signed response with the network-generated signed response;

allocating the mobile station with an individual temporary mobile station identifier if comparisons performed during said step of comparing are of selected values;

transferring the data between the mobile station, through the network and the correspondent entity; and performing location management procedures, wherein the steps of allocating the mobile station with the individual temporary mobile station identifier, transferring the data, and performing the location management procedures comprise ciphering and deciphering transmissions pursuant thereto.

5. A method of for providing anonymous data transfer service to at least one group of mobile stations in a mobile telecommunication system to permit anonymous transfer of data between a mobile station of the at least one group of mobile stations and a correspondent entity by way of a telecommunication network, said method comprising the steps of:

forming the at least one group of mobile stations, the at least one group defined by a group identity and an associated group subscriber authentication key;

providing a copy of the group identity and the authentication key to each mobile station of the at least one group;

initiating an attach procedure, the attach procedure including an attach request sent by a mobile station of the group to the telecommunication network, the attach request including the group identity provided to each mobile station of the at least one group during said step of providing;

allocating to the mobile station a network-generated random number responsive to the attach request to provide a unique ciphering key for each mobile station in a group identity group;

calculating at the mobile station a mobile station-generated signed response of a value, at least in part, responsive to the authentication key and the network-generated random number;

sending the mobile station-generated signed response to the telecommunication network;

calculating at the telecommunication network a network-generated signed response calculated, also at least in part, responsive to the authentication key and the network-generated random number;

comparing the mobile station-generated signed response with the network-generated signed response;

allocating the mobile station with an individual temporary mobile station identifier if comparisons performed during said step of comparing are of selected values;

transferring the data between the mobile station, through the network and the correspondent entity; and performing location management procedures.

6. A method for providing anonymous data transfer service to at least one group of mobile stations in a mobile telecommunication system to permit anonymous transfer of data between a mobile station of the at least one group of mobile stations and a correspondent entity by way of a telecommunication network, said method comprising the steps of:

forming the at least one group of mobile stations, the at least one group defined by a group identity and an associated group subscriber authentication key;

providing a copy of the group identity and the authentication key to each mobile station of the at least one group;

initiating an attach procedure, the attach procedure including an attach request sent by a mobile station of the group to the telecommunication network, the attach request including the group identity provided to each mobile station of the at least one group during said step of providing;

allocating to the mobile station a network-generated random number responsive to the attach request;

calculating at the mobile station a mobile station-generated signed response of a value, at least in part, responsive to the authentication key and the network-generated random number;

sending the mobile station-generated signed response to the telecommunication network;

calculating at the telecommunication network a network-generated signed response calculated, also at least in part, responsive to the authentication key and the network-generated random number;

comparing the mobile station-generated signed response with the network-generated signed response;

allocating the mobile station with an individual temporary mobile station identifier by allocating to the mobile station a network layer identity if comparisons performed during said step of comparing are of selected values;

transferring the data between the mobile station, through the network and the correspondent entity; and performing location management procedures, wherein data transfers performed during said step of transferring the data and location management procedures performed during said step of performing the location management procedures further comprise performing data transfers from the correspondent entity to the mobile station and associated location management procedures, as a manner to allow two-way communication between the mobile station and the correspondent entity.

7. A method for providing anonymous data transfer service to at least one group of mobile stations in a mobile telecommunication system to permit anonymous transfer of data between a mobile station of the at least one group of mobile stations and a correspondent entity by way of a telecommunication network, said method comprising the steps of:

forming the at least one group of mobile stations, the at least one group defined by a group identity and an associated group subscriber authentication key;

providing a copy of the group identity and the authentication key to each mobile station of the at least one group;

initiating an attach procedure, the attach procedure including an attach request sent by a mobile station of the group to the telecommunication network, the attach request including the group identity provided to each mobile station of the at least one group during said step of providing;

allocating to the mobile station a network-generated random number responsive to the attach request;

calculating at the mobile station a mobile station-generated signed response of a value, at least in part, responsive to the authentication key and the network-generated random number;

sending the mobile station-generated signed response to the telecommunication network;

calculating at the telecommunication network a network-generated signed response calculated, also at least in part, responsive to the authentication key and the network-generated random number;

comparing the mobile station-generated signed response with the network-generated signed response;

allocating, by the network, the mobile station with an individual temporary mobile station identifier, comprising a temporary international mobile subscriber identity in order to facilitate similar handling in the network as per non-anonymous mobile subscribers if comparisons performed during said step of comparing are of selected values;

transferring the data between the mobile station, through the network and the correspondent entity; and performing location management procedures.

8. A method for providing anonymous data transfer service to at least one group of mobile stations in a mobile telecommunication system to permit anonymous transfer of packet data between a mobile station of the at least one group of mobile stations and a correspondent entity by way of a telecommunication network, said method comprising the steps of:

forming the at least one group of mobile stations, the at least one group defined by a group identity and an associated group subscriber authentication key;

providing a copy of the group identity and the authentication key to each mobile station of the at least one group;

initiating an attach procedure, the attach procedure including an attach request sent by a mobile station of the group to the telecommunication network, the attach request including the group identity provided to each mobile station of the at least one group during said step of providing;

allocating to the mobile station a network-generated random number responsive to the attach request;

calculating at the mobile station a mobile station-generated signed response of a value, at least in part, responsive to the authentication key and the network-generated random number;

19 sending the mobile station-generated signed response to the telecommunication network;

calculating at the telecommunication network a network-generated signed response calculated, also at least in part, responsive to the authentication key and the network-generated random number;

comparing the mobile station-generated signed response with the network-generated signed response;

allocating the mobile station with an individual temporary mobile station identifier if comparisons performed during said step of comparing are of selected values;

transferring the data between the mobile station, through the network and the correspondent entity; and performing location management procedures, when the packet exchange sequence between the mobile station and a correspondent entity is always initiated by the mobile station, comprising the steps of:

performing location updating by the mobile station only during periods of active packet exchange sequences;

rejecting, at the network, an attempt to transfer a packet to the mobile station during the periods extending between active packet exchange sequences; and initiating at the mobile station a new packet exchange sequence with an explicit or implicit location update.

9. A method for providing anonymous data transfer service to at least one group of mobile stations in a mobile telecommunication system to permit anonymous transfer of data between a mobile station of the at least one group of mobile stations and a correspondent entity by way of a telecommunication network, said method comprising the steps of:

forming the at least one group of mobile stations, the at least one group defined by a group identity and an associated group subscriber authentication key;

providing a copy of the group identity and the authentication key to each mobile station of the at least one group;

initiating an attach procedure, the attach procedure including an attach request sent by a mobile station of the group to the telecommunication network, the attach request including the group identity provided to each mobile station of the at least one group during said step of providing;

allocating to the mobile station a network-generated random number responsive to the attach request;

calculating at the mobile station a mobile station-generated signed response of a value, at least in part, responsive to the authentication key and the network-generated random number;

sending the mobile station-generated signed response to the telecommunication network;

calculating at the telecommunication network a network-generated signed response calculated, also at least in part, responsive to the authentication key and the network-generated random number;

comparing the mobile station-generated signed response with the network-generated signed response;

allocating the mobile station with an individual temporary mobile station identifier if comparisons performed during said step of comparing are of selected values;

transferring the data between the mobile station, through the network and the correspondent entity;

20 identifying the mobile station to the correspondent entity on an end-to-end application layer; and performing location management procedures.

10. A method for providing anonymous data transfer service to at least one group of mobile stations in a mobile telecommunication system to permit anonymous transfer of data between a mobile station of the at least one group of mobile stations and a correspondent entity by way of a telecommunication network, said method comprising the steps of:

forming the at least one group of mobile stations, the at least one group defined by a group identity and an associated group subscriber authentication key;

providing a copy of the group identity and the authentication key to each mobile station of the at least one group;

initiating an attach procedure, the attach procedure including an attach request sent by a mobile station of the group to the telecommunication network, the attach request including the group identity provided to each mobile station of the at least one group during said step of providing;

allocating to the mobile station a network-generated random number responsive to the attach request;

calculating at the mobile station a mobile station-generated signed response of a value, at least in part, responsive to the authentication key and the network-generated random number;

sending the mobile station-generated signed response to the telecommunication network;

calculating at the telecommunication network a network-generated signed response calculated, also at least in part, responsive to the authentication key and the network-generated random number;

comparing the mobile station-generated signed response with the network-generated signed response;

allocating the mobile station with an individual temporary mobile station identifier if comparisons performed during said step of comparing are of selected values;

transferring the data between the mobile station, through the network and the correspondent entity;

providing ciphering between the mobile station and the correspondent entity on an end-to-end application layer; and performing location management procedures.

11. A method for providing anonymous data transfer service to at least one group of mobile stations in a mobile telecommunication system to permit anonymous transfer of data between a mobile station of the at least one group of mobile stations and a correspondent entity by way of a telecommunication network, said method comprising the steps of:

forming the at least one group of mobile stations, the at least one group defined by a group identity and an associated group subscriber authentication key;

providing a copy of the group identity and the authentication key to each mobile station of the at least one group;

initiating an attach procedure, the attach procedure including an attach request sent by a mobile station of the group to the telecommunication network, the attach request including the group identity provided to each mobile station of the at lease one group during said step of providing;

allocating to the mobile station a network-generated random number responsive to the attach request;

calculating at the mobile station a mobile station-generated signed response of a value, at least in part, responsive to the authentication key and the network-generated random number;

sending the mobile station-generated signed response to the telecommunication network;

calculating at the telecommunication network a network-generated signed response calculated, also at least in part, responsive to the authentication key and the network-generated random number;

comparing the mobile station-generated signed response with the network-generated signed response;

allocating the mobile station with an individual temporary mobile station identifier if comparisons performed during said step of comparing are of selected values;

transferring the data between the mobile station, through the network and the correspondent entity and charging therefor based on the group identity; and performing location management procedures.

12. A method for providing anonymous data transfer service to at least one group of mobile stations in a mobile telecommunication system to permit anonymous transfer of circuit-switched data between a mobile station of the at least one group of mobile stations and a correspondent entity by way of a telecommunication network, said method comprising the steps of:

forming the at least one group of mobile stations, the at least one group defined by a group identity and an associated group subscriber authentication key;

providing a copy of the group identity and the authentication key to each mobile station of the at least one group;

initiating an attach procedure, the attach procedure including an attach request sent by a mobile station of the group to the telecommunication network, the attach request including the group identity provided to each mobile station of the at least one group during said step of providing;

allocating to the mobile station a network-generated random number responsive to the attach request;

calculating at the mobile station a mobile station-generated signed response of a value, at least in part, responsive to the authentication key and the network-generated random number;

sending the mobile station-generated signed response to the telecommunication network;

calculating at the telecommunication network a network-generated signed response calculated, also at least in part, responsive to the authentication key and the network-generated random number;

comparing the mobile station-generated signed response with the network-generated signed response;

allocating the mobile station with an individual temporary mobile station identifier if comparisons performed during said step of comparing are of selected values;

transferring the data between the mobile station, through the network and the correspondent entity by originating circuit-switched data calls at the mobile station; and performing location management procedures.

13. The method of claim 12 wherein said step of performing location management procedures comprises the steps of:

performing location updating by the mobile station only periodically and, as required, before initiating at the mobile station a new data call; and rejecting at the telecommunication network an attempt to establish a mobile-terminated call.

14. A method for providing anonymous data transfer service to at least one group of mobile stations in a mobile telecommunication system to permit anonymous transfer of data between a mobile station of the at least one group of mobile stations and a correspondent entity by way of a telecommunication network, said method comprising the steps of:

forming the at least one group of mobile stations, the at least one group defined by a group identity and an associated group subscriber authentication key;

providing a copy of the group identity and the authentication key to each mobile station of the at least one group;

initiating an attach procedure, the attach procedure including an attach request sent by a mobile station of the group to the telecommunication network, the attach request including the group identity provided to each mobile station of the at least one group during said step of providing;

allocating to the mobile station a network-generated random number responsive to the attach request;

calculating at the mobile station a mobile station-generated signed response of a value, at least in part, responsive to the authentication key and the network-generated random number;

sending the mobile station-generated signed response to the telecommunication network;

calculating at the telecommunication network a network-generated signed response calculated, also at least in part, responsive to the authentication key and the network-generated random number;

comparing the mobile station-generated signed response with the network-generated signed response;

exchanging at least one ciphering key between the mobile station and the network, if comparisons performed during said step of comparing are of selected values;

allocating the mobile station with an individual temporary mobile station identifier if comparisons performed during said step of comparing are of selected values;

transferring the data between the mobile station, through the network and the correspondent entity; and performing location management procedures.

15. The method of claim 14 wherein communications between the mobile station and the network during said steps of allocating the mobile station with the individual temporary mobile station identifier, transferring the data, and performing location management procedures are ciphered with the at least one ciphering key exchanged during said step of exchanging.

16. A method for providing anonymous data transfer service to at least one group of mobile stations in a mobile telecommunication system to permit anonymous transfer of data between a mobile station of the at least one group of mobile stations and a correspondent entity by way of a telecommunication network, said method comprising the steps of:

forming the at least one group of mobile stations, the at least one group defined by a group identity and an associated group subscriber authentication key;

providing a copy of the group identity and the authentication key to each mobile station of the at least one group;

initiating an attach procedure by exchanging at least one ciphering key between the mobile station and the network, and then sending an attach request from the mobile station to the telecommunication network, the attach request including the group identity provided to each mobile station of the at least one group during said step of providing;

allocating to the mobile station a network-generated random number responsive to the attach request;

calculating at the mobile station a mobile station-generated signed response of a value, at least in part, responsive to the authentication key and the network-generated random number;

sending the mobile station-generated signed response to the telecommunication network;

calculating at the telecommunication network a network-generated signed response calculated, also at least in part, responsive to the authentication key and the network-generated random number;

comparing the mobile station-generated signed response with the network-generated signed response;

allocating the mobile station with an individual temporary mobile station identifier if comparisons performed during said step of comparing are of selected values;

transferring the data between the mobile station, through the network and the correspondent entity; and performing location management procedures.

17. The method of claim 16 wherein communications between the mobile station and the network during a portion of the step of initiating the attach procedure during which the group identity is sent to the telecommunication network, and during said steps of allocating to the mobile station a network-generated random number, sending the mobile station-generated signed response, allocating the mobile station with an individual temporary mobile station identifier, transferring the data, and performing location management procedures are ciphered with the at least one ciphering key exchanged during said step of exchanging.

18. A method for initiating data transmission in a communication system having a communication network for effectuating anonymous communication between at least a first communication station and a correspondent entity prior to which the network is required to authenticate the communication station and inhibited from learning the specific personal identity of the communication station, the first communication station being a group-identified communication station of a group of group-identified communication stations, each group-identified communication station of the group identified by a group identifier which is common to all of the members of the group, said method comprising the steps of:

providing a common group identifier signal to the communication network, the group identifier signal of a value representative of at least the group identifier and not including any indicia of identity from which the communication network can ascertain the specific personal identity of the first communication station;

accessing at least a first network coded signal and a second network-coded signal responsive, at least in part, to a value corresponding to the group identifier signal provided to the communication network during said step of providing;

sending the second network-coded signal accessed during said step of accessing, to the first communication station;

forming a first station-coded signal at the first communication station responsive to reception of the second network-coded signal sent during said step of sending;

comparing the first network-coded signal with the first station-coded signal; and authorizing initiation of transmission of data between the first communication station and the correspondent entity responsive to comparisons performed during said step of comparing.

19. A method for initiating data transmission in a communication system having a communication network for effectuating communication between at least a first communication station and a correspondent entity, the first communication station being a group-identified communication station of a group of group-identified communication stations, each group-identified communication station of the group identified by a group identifier, said method comprising the steps of:

transmitting a group identifier signal from the first communication station to the communication network, the group identifier signal being of a value representative of at least the group identifier;

accessing at least a first network coded signal and a second network-coded signal responsive, at least in part, to a value corresponding to the group identifier signal provided to the communication network during said step of providing;

sending the second network-coded signal accessed during said step of accessing, to the first communication station;

forming a first station-coded signal at the first communication station responsive to reception of the second network-coded signal sent during said step of sending;

comparing the first network-coded signal with the first station-coded signal; and authorizing initiation of transmission of data between the first communication station and the correspondent entity responsive to comparisons performed during said step of comparing.

20. A method for initiating data transmission in a communication system having a communication network for effectuating communication between at least a first communication station and a correspondent entity, the first communication station being a group-identified communication station of a group of group-identified communication stations, each group-identified communication station of the group identified by a group identifier, said method comprising the steps of:

providing a group identifier signal to the communication network, the group identifier signal of a value representative of at least the group identifier;

accessing at least a first network coded signal and a second network-coded signal responsive, at least in part, to a value corresponding to the group identifier signal provided to the communication network during said step of providing, said first network-coded signal being formed by altering the second network-coded signal with an authentication code associated with the group identifier;

sending the second network-coded signal accessed during said step of accessing, to the first communication station;

forming a first station-coded signal at the first communication station responsive to reception of the second network-coded signal sent during said step of sending;

comparing the first network-coded signal with the first station-coded signal; and authorizing initiation of transmission of data between the first communication station and the correspondent entity responsive to comparisons performed during said step of comparing.

21. A method for initiating data transmission in a communication system having a communication network for effectuating communication between at least a first communication station and a correspondent entity, the first communication station being a group-identified communication station of a group of group-identified communication stations, each group-identified communication station of the group identified by a group identifier, said method comprising the steps of:

providing a group identifier signal to the communication network, the group identifier signal of a value representative of at least the group identifier;

accessing at least a first network coded signal and a second network-coded signal responsive, at least in part, to a value corresponding to the group identifier signal provided to the communication network during said step of providing;

sending the second network-coded signal accessed during said step of accessing, to the first communication station;

forming a first station-coded signal at the first communication station responsive to reception of the second network-coded signal sent during said step of sending by altering the second network-coded signal with an authentication code associated with the group identifier;

comparing the first network-coded signal with the first station-coded signal; and authorizing initiation of transmission of data between the first communication station and the correspondent entity responsive to comparisons performed during said step of comparing.

22. A method for initiating data transmission in a communication system having a communication network for effectuating communication between at least a first communication station and a correspondent entity, the first communication station being a group-identified communication station of a group of group-identified communication stations, each group-identified communication station of the group identified by a group identifier, said method comprising the steps of:

providing a group identifier signal to the communication network, the group identifier signal of a value representative of at least the group identifier;

accessing at least a first network coded signal and a second network-coded signal responsive, at least in part, to a value corresponding to the group identifier signal provided to the communication network during said step of providing;

sending the second network-coded signal accessed during said step of accessing, to the first communication station;

forming a first station-coded signal at the first communication station responsive to reception of the second network-coded signal sent during said step of sending;

transmitting the first station-coded signal to the communication network;

comparing the first network-coded signal with the first station-coded signal at the communication network; and authorizing initiation of transmission of data between the first communication station and the correspondent entity responsive to comparisons performed during said step of comparing.

23. A method for initiating data transmission in a communication system having a communication network for effectuating communication between at least a first communication station and a correspondent entity, the first communication station being a group-identified communication station of a group of group-identified communication stations, each group-identified communication station of the group identified by a group identifier, said method comprising the steps of:

providing a group identifier signal to the communication network, the group identifier signal of a value representative of at least the group identifier;

accessing at least a first network coded signal and a second network-coded signal responsive, at least in part, to a value corresponding to the group identifier signal provided to the communication network during said step of providing;

sending the second network-coded signal accessed during said step of accessing, to the first communication station;

forming a first station-coded signal at the first communication station responsive to reception of the second network-coded signal sent during said step of sending;

comparing the first network-coded signal with the first station-coded signal; and authorizing initiation of transmission of data between the first communication station and the correspondent entity responsive to the first network-coded signal substantially corresponding to the first station-coded signal.

24. A method for initiating data transmission in a communication system having a communication network for effectuating communication between at least a first communication station and a correspondent entity, the first communication station being a group-identified communication station of a group of group-identified communication stations, each group-identified communication station of the group identified by a group identifier, said method comprising the steps of:

providing a group identifier signal to the communication network, the group identifier signal of a value representative of at least the group identifier;

accessing at least a first network coded signal and a second network-coded signal responsive, at least in part, to a value corresponding to the group identifier signal provided to the communication network during said step of providing;

sending the second network-coded signal accessed during said step of accessing, to the first communication station;

forming a first station-coded signal at the first communication station responsive to reception of the second network-coded signal sent during said step of sending;

comparing the first network-coded signal with the first station-coded signal;

authorizing initiation of transmission of data between the first communication station and the correspondent entity responsive to comparisons performed during said step of comparing; and transmitting data from the first communication station to the correspondent entity.

25. A method for initiating data packet transmission in a communication system having a communication network for effectuating communication between at least a first communication station and a correspondent entity, the first communication station being a group-identified communication station of a group of group-identified communication stations, each group-identified communication station of the group identified by a group identifier, said method comprising the steps of:

providing a group identifier signal to the communication network, the group identifier signal of a value representative of at least the group identifier;

accessing at least a first network coded signal and a second network-coded signal responsive, at least in part, to a value corresponding to the group identifier signal provided to the communication network during said step of providing;

sending the second network-coded signal accessed during said step of accessing, to the first communication station;

forming a first station-coded signal at the first communication station responsive to reception of the second network-coded signal sent during said step of sending;

comparing the first network-coded signal with the first station-coded signal; and authorizing initiation of transmission of data formatted according to a connectionless protocol between the first communication station and the correspondent entity responsive to comparisons performed during said step of comparing.

26. A method for initiating data transmission in a communication system having a communication network for effectuating communication between at least a first communication station and a correspondent entity, the first communication station being a group-identified communication station of a group of group-identified communication stations, each group-identified communication station of the group identified by a group identifier, said method comprising the steps of:

storing an authentication code associated with the group identifier at a storage location of the communication network;

providing a group identifier signal to the communication network, the group identifier signal of a value representative of at least the group identifier;

accessing at least a first network coded signal and a second network-coded signal responsive, at least in part, to a value corresponding to the group identifier signal provided to the communication network during said step of providing;

sending the second network-coded signal accessed during said step of accessing, to the first communication station;

forming a first station-coded signal at the first communication station responsive to reception of the second network-coded signal sent during said step of sending;

comparing the first network-coded signal with the first station-coded signal; and authorizing initiation of transmission of data between the first communication station and the correspondent entity responsive to comparisons performed during said step of comparing.

27. The method of claim 26 wherein said step of storing further comprises storing a destination address associated with the group identifier, the destination address identifying a correspondent entity to which the data is to be transmitted.

28. A method for initiating data transmission in a communication system having a communication network for effectuating communication between at least a first communication station and a correspondent entity, the first communication station being a group-identified communication station of a group of group-identified communication stations, each group-identified communication station of the group identified by a group identifier, said method comprising the steps of:

storing a first network coded signal and a second network coded signal at a storage location of the communication network;

providing a group identifier signal to the communication network, the group identifier signal of a value representative of at least the group identifier;

accessing at least the first network coded signal and the second network-coded signal responsive, at least in part, to a value corresponding to the group identifier signal provided to the communication network during said step of providing;

sending the second network-coded signal accessed during said step of accessing, to the first communication station;

forming a first station-coded signal at the first communication station responsive to reception of the second network-coded signal sent during said step of sending;

comparing the first network-coded signal with the first station-coded signal; and authorizing initiation of transmission of data between the first communication station and the correspondent entity responsive to comparisons performed during said step of comparing.

29. A method for initiating data transmission in a communication system having a communication network for effectuating communication between at least a first communication station and a correspondent entity, the first communication station being a group-identified communication station of a group of group-identified communication stations, each group-identified communication station of the group identified by a group identifier, said method comprising the steps of:

providing a group identifier signal to the communication network, the group identifier signal being of a value which temporarily uniquely identifies the first communication station;

accessing at least a first network coded signal and a second network-coded signal responsive, at least in part, to a value corresponding to the group identifier signal provided to the communication network during said step of providing;

sending the second network-coded signal accessed during said step of accessing, to the first communication station;

forming a first station-coded signal at the first communication station responsive to reception of the second network-coded signal sent during said step of sending;

comparing the first network-coded signal with the first station-coded signal; and authorizing initiation of transmission of data between the first communication station and the correspondent entity responsive to comparisons performed during said step of comparing.

30. In a communication system having a communication network for effectuating communication between at least a first communication station and a correspondent entity, the first communication station being a group-identified communication station of a group of group-identified communication stations, each group-identified communication station of the group identified by a group identifier, an improvement of apparatus for initiating data transmission, the data transmission being initiated only after the first communication station has been authenticated as a member of the group and without the communication network being able to specifically identify the first communication station, said apparatus comprising:

- a group identifier signal generator positioned at the first communication station, said group identifier signal generator for generating a group identifier signal of a value representative of at least the group identifier and not including any indicia of identity from which the communication network can ascertain the specific personal identity of the first communication station and for transmitting the group identifier signal to the communication network;
- a network-coded signal accessor and transmitter positioned at the communication network, said network-coded signal accessor and transmitter for accessing at least a first network coded signal and a second network-coded signal responsive, at least in part, to the group identifier signal transmitted to the communication network by said group identifier signal generator and for transmitting the second network-coded signal to the first communication station;
- a station-coded signal generator positioned at the first communication station, said station-coded signal generator for forming a first station-coded signal responsive to reception of the second network-coded signal at the first communication station;
- a comparator coupled to receive indications of the first network-coded signal and the first station-coded signal, said comparator for comparing values of the first network-coded signal and the first station-coded signal and for selectively authorizing initiation of transmission of the data between the first communication station and the correspondent entity responsive to comparisons performed thereat.

31. In a communication system having a communication network for effectuating communication, an improvement of a first communication station, said first communication station for communicating with the communication network and being a group-identified communication station of a group of group-identified communication stations, each group-identified communication station of the group identified by a common group identifier, said first communication station comprising:

- a group identifier signal generator for generating a group identifier signal of a value representative of at least the group identifier and not including any indicia of identity from which the communication network can ascertain the specific personal identity of the first communication station, said generator also transmitting the group identifier signal to the communication network;
- a receiver for receiving communication network-generated response signals generated by the communication network responsive to transmission to the communication network of the group identifier signal by said group identifier signal generator; and
- a station-coded signal generator coupled to receive indications of the communication-network generated response, said station-coded signal generator for forming a first station-coded signal responsive to reception of a second network-coded signal at the first communication station.

32. Communication network apparatus for effectuating anonymous communication between at least a first communication station and a correspondent entity following authentication of said first communication station and in which said network apparatus and correspondent entity are inhibited from learning the specific personal identity of the at least first communication station, the first communication station being a group-identified communication station of a group of group-identified communication stations, each group-identified communication station of the group identified by a common group identifier, said communication network apparatus comprising:

- a receiver coupled to receive communication-station generated signals generated by the first communication station, the communication station-generated signals including at least a group identifier signal and a first station-coded signal, the group identifier signal of a value representative of at least the group identifier and not including any indicia of identity from which the communications network can ascertain the specific personal identity of the first communication station;
- a network-coded signal accessor and transmitter for accessing at least a first network coded signal and a second network-coded signal responsive, at least in part, to the group identifier signal received by said receiver and for transmitting the second network-coded signal to the first communication station; and
- a comparator coupled to receive indications of the first network-coded signal and the first station-coded signal, said comparator for comparing values of the first network-coded signal and the first station-coded signal and for selectively authorizing initiation of transmission of the data between the first communication station and correspondent entity responsive to comparisons performed thereat.

* * * * *

UNITED STATES PATENT AND TRADEMARK OFFICE
CERTIFICATE OF CORRECTION

PATENT NO. : 5,729,537

DATED : March 17, 1998

INVENTOR(S) : Lars Axel Billstrom

It is certified that error appears in the above-identified patent and that said Letters Patent is hereby corrected as shown below:

| | |
|---|---|
| Column 2, line 44 | Replace "international" With --International-- |
| Column 2, line 45 | Replace "identity" With --Identity-- |
| Column 4, line 10 | Replace "identity" With --Identity-- |
| Column 8, line 11 | Replace "byway" With --by way-- |
| Column 10, line 16 | Replace "network to" With --network 14 to-- |
| Column 14, line 63-64 | Delete "wherein said step of transferring the data comprises transferring" |
| Column 16, line 36 | Replace "A method of for" With --A method for-- |

UNITED STATES PATENT AND TRADEMARK OFFICE
CERTIFICATE OF CORRECTION

PATENT NO. : 5,729,537

DATED : March 17, 1998

INVENTOR(S) : Lars Axel Billstrom

It is certified that error appears in the above-identified patent and that said Letters Patent is hereby corrected as shown below:

Column 20, line 66     Replace "lease"
                          With --least--

Signed and Sealed this

Twenty-seventh Day of March, 2001

*Attest:*

NICHOLAS P. GODICI

*Attesting Officer*     *Acting Director of the United States Patent and Trademark Office*